INVENTOR.
KENNETH E. POPE
BY
Drummond & Cahill
ATTORNEYS

United States Patent Office 3,445,857
Patented May 20, 1969

3,445,857
RECORDING ACCELEROMETER
Kenneth E. Pope, Litchfield Park, Ariz., assignor to
UMC Industries, Inc., a corporation of Missouri
Filed June 8, 1967, Ser. No. 644,593
Int. Cl. G01d 9/10
U.S. Cl. 346—7                                        4 Claims

ABSTRACT OF THE DISCLOSURE

An accelerometer device utilizing a rotating shaft displaceable angularly in correspondence with acceleration along the axis of the shaft. A disc is secured to the shaft and a stylus attached to a pendulous mass is in contact with the disc. The pendulous mass is responsive to accelerations orthogonal to the axis of the shaft.

Background of the invention

The present invention pertains to accelerometers, and more particularly, to recording-type accelerometers. The behavioral study of bodies subjected to plural acceleration forces necessitates the utilization of recording media to obtain a record of the forces acting upon the body. For example, in the study of the aerodynamics of a missile design, the acceleration forces acting upon the body must be predetermined to effectuate an appropriate design; however, theoretical calculations of these values cannot replace empirical data derived from actual tests.

Prior art attempts to record such acceleration forces have resulted in unusually complicated and intricate devices which have not proven altogether reliable and which have been extremely expensive. The ruggedness of the device must be insured, especially in those instances where acceleration forces are to be encountered that are extremely high (e.g., 100 to 200 g's).

It is therefore an object of the present invention to provide an accelerometer capable of recording the acceleration forces exerted on a body to which the accelerometer is attached.

It is a further object of the present invention to provide a data storage accelerometer capable of permanently recording accelerations along a predetermined axis and, on the same record, recording accelerations orthogonal to the predetermined axis.

It is still another object of the present invention to provide an inexpensive rugged and reliable data storage accelerometer utilizing simple elements in combination for inscribing a pattern indicative of the acceleration forces exerted on the accelerometer.

These and other objects of the present invention will become apparent to those skilled in the art as the description thereof proceeds.

Brief description of the preferred embodiment

Briefly, in accordance with the embodiment chosen for illustration, a rotatable shaft is mounted along a preferred axis for sensing accelerations along the axis of the shaft. A linear-to-rotary transducer of any of a variety of designs is utilized to translate accelerations along the axis of the shaft into rotary motion of the shaft. A restraining spring is provided to maintain the shaft in a null position and resist rotation. A disc is secured to the shaft for rotation therewith and is angularly displaced against the force of the spring proportionately to the accelerations sensed along the axis of the shaft. A pendulous mass is positioned relative to the disc to sense accelerations orthogonal to the axis of the shaft and is also provided with a stylus at the free end thereof for contact with the disc. The pendulous mass is spring-biased to a null position wherein the stylus secured thereto is in contact with the disc at a point approximately bisecting a radius of the disc. The disc surface is sensitive to stylus pressure to leave an optically visible mark at any point of contact between the stylus and the surface.

Brief description of drawings

The present invention may more readily be described by reference to the accompanying drawings in which.

Detailed description of the drawings

Figure 1:
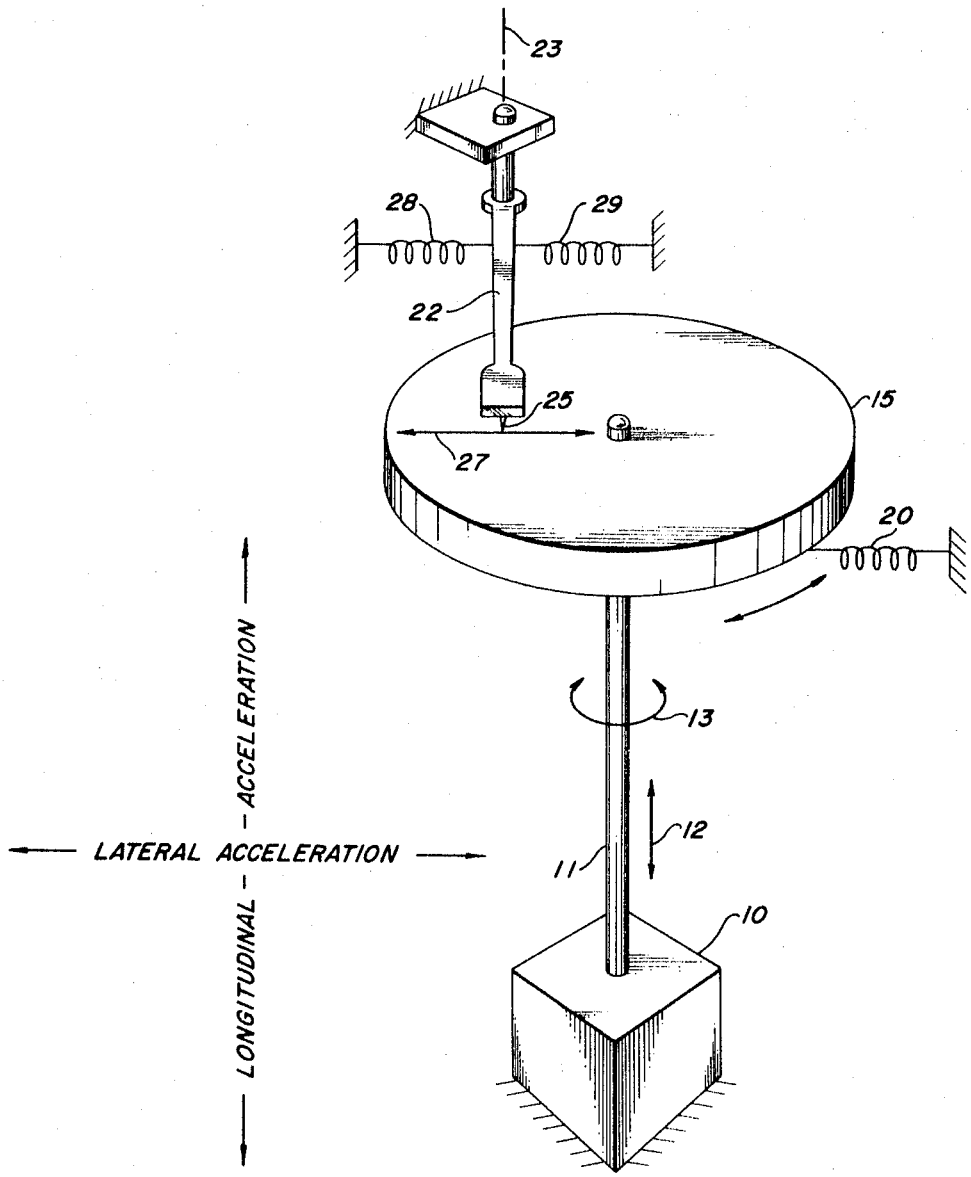
FIGURE 1 is a schematic illustration of a data storage accelerometer constructed in accordance with the teachings of the present invention.

Referring now to FIGURE 1, the schematic illustration shown therin includes a linear-to-rotary transducer 10 which may take the form of any of a variety of well-known constructions. The linear-to-rotary transducer is sensitive to accelerations along the axis of a shaft lip as indicated generally by the arrow 12. Accelerations along this axis result in a linear motion of the linear-to-rotary transducer and ultimately result in the rotation of the shaft 11 as indicated generally by the arrow 13. A disc 15 is secured to the shaft 11 for rotation therewith. The rotation of the shaft 11 and the disc 15 is restrained by a calibrated resistance spring shown schematically in FIGURE 1 at 20. Thus, accelerations along the axis of the shaft 11 result in a force applied to the disc 15 to cause the rotation thereof about the axis of the shaft 11, the resistance to the rotation by the spring 20 resulting in an angular displacement of the disc 15 corresponding to the magnitude of the acceleration.

An acceleration responsive means which in the embodiment chosen for illustration is shown as a pendulous mass 22 is mounted for pivotal movement about an axis 23 parallel to the axis of the shaft 11. Thus, the pendulous mass is sensitive to accelerations orthogonal to the axis of the shaft 11. A stylus 25 is secured to the free end of the pendulous mass 22 and is in contact with the surface of the disc 15. Pivotal movement of the pendulous mass 22 results in an arcuate movement of the stylus 25 as indicated generally by the arrow 27. The pendulous mass 22 is held in a null position by calibrated resistance springs 28 and 29 such that the stylus 25, in the null position, will bisect a radius of the disc 15. Therefore, lateral or orthogonal accelerations will result in movement of the stylus 25 over the surface of the disc 15 along a path that is closely radial of the disc 15 (since the pendulous mass 22 is pivotally mounted, it will be obvious that the path of the stylus 25 will be somewhat arcuate, and the curvature of the arc will depend on the distance between the stylus and the axis 23). It may also be possible to arrange for the sensing of lateral or orthogonal accelerations by using a mass unconstrained to a pivotal mounting; however, such arrangement would result in a more complicated structure. It will also be obvious to those skilled in the art that it may be possible to utilize a recording head other than a stylus such as, for example, a narrow lightbeam to impinge upon a photosensitive coating on the surface of the disc 15. It has been found that the utilization of a conventional standard .001 inch diamond stylus with approximately 2 grams pressure leaves an acceptable trace on a gold or aluminum plated surface on the disc 15.

Figure 2A:
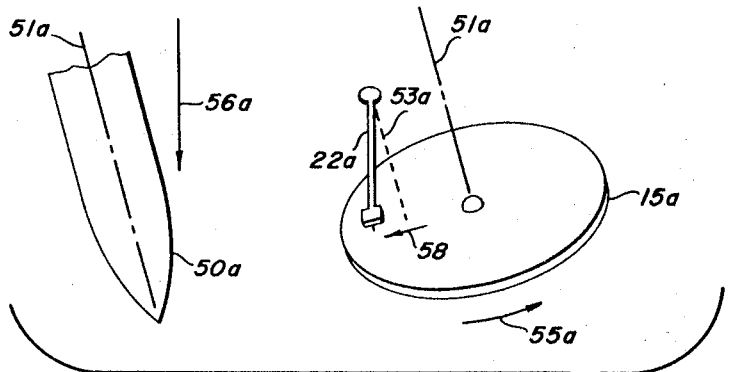
FIGURES 2a, 2b and 2c are schematic illustrations of a portion of the apparatus of FIGURE 1 shown in conjunction with the positioning of a missile nose cone and which are useful for describing the operation of the apparatus of FIGURE 1.
Figure 2B:
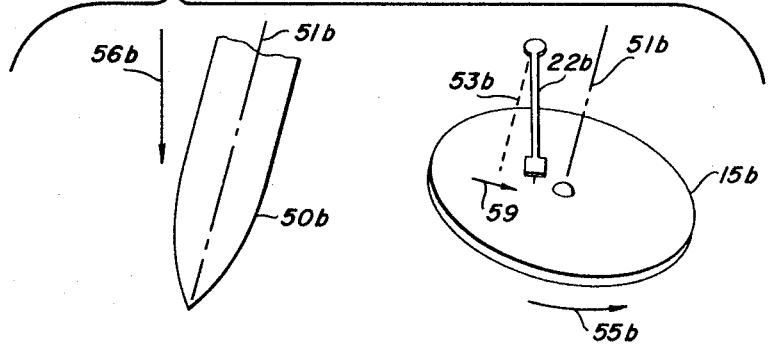
Figure 2C:
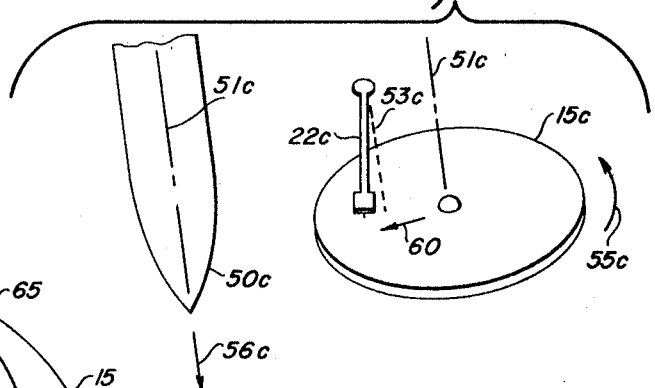

Referring now to FIGURES 2a, 2b and 2c, the operation of the apparatus of the present invention may be described. In each of these figures, a missile is indicated at 50 and a longitudinal axis of the missile is indicated at 51. Alongside each schematic representation of the missile is the recording disc 15 of the data recording accelerometer of the present invention. Similarly, the pendulous mass 22 is indicated and a dotted line 53 is used to illustrate the motion of the pendulous mass from its previous position. The accelerometer is mounted having the axis of its rotating shaft corresponding to the longitudinal axis of the missile. Therefore, the axis indicated in each of the FIGURES 2a, 2b and 2c is given the same reference numeral as the corresponding missile axis. In each of the figures, it is assumed that a longitudinal acceleration is being experienced by the missile which results in an angular displacement of the disc 15 as indicated by the arrow 55. In FIGURE 2a, it may be seen that the missile has deviated from its nominal direction of travel 56 as a result of a lateral or orthogonal acceleration; this acceleration has resulted in the displacement of the pendulous mass 22 in the direction indicated by the arrow 58. In FIGURE 2b, the missile has been displaced in the opposite direction from the nominal direction of travel 56 by an acceleration causing the displacement of the pendulous mass 22 as indicated by the arrow 59. Similarly, in FIGURE 2c, the pendulous mass has been displaced in a direction as indicated by the arrow 60.

Figure 3:
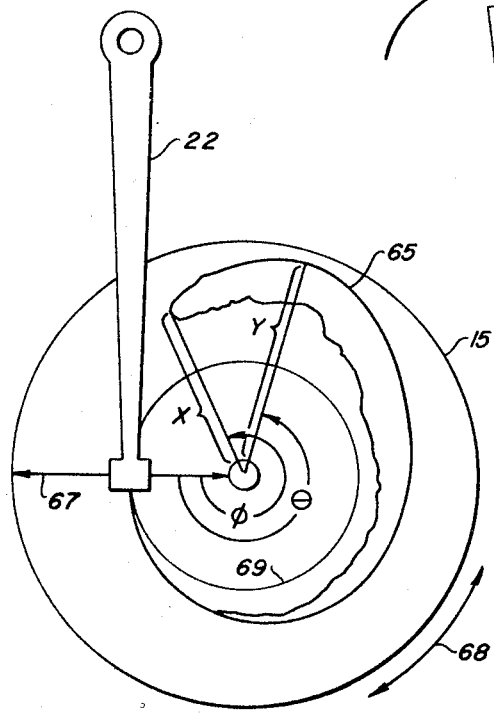
FIGURE 3 is a hypothetical acceleration trace useful for describing the operation of the apparatus of FIGURE 1.

A typical and hypothetical acceleration trace may be seen by reference to FIGURE 3 wherein lateral or orthogonal accelerations and longitudinal accelerations are contained on a single trace and may be determined by utilizing a polar scale. Referring to FIGURE 3, the recording surface of the disc 15 has inscribed thereon a continuous trace 65 of the lateral or orthogonal acceleration and longitudinal acceleration of the data accumulation accelerometer. The pendulous mass 22 is shown in its null position and the direction of motion of the stylus secured thereto in response to orthogonal acceleration is indicated by the arrow 67. Arcuate displacements of the disc 15 as indicated by the arrow 68 correspond to accelerations along the axis of the rotating shaft, as indicated in FIGURE 1. As described previously, the stylus is biased to a null position approximately bisecting a radius of the disc 15. Thus, a position of zero lateral or zero orthogonal acceleration is indicated by a curve forming a circle shown in FIGURE 3 at 69. If no lateral or orthogonal accelerations are experienced by the accelerometer, the stylus would not deviate from the circular path 69; however, deviations from this circular path 69 represents the magnitude, and direction, of accelerations orthogonal to the axis of the shaft. Similarly, the radius of the disc 15 passing through the stylus at a time when no longitudinal acceleration is experienced by the accelerometer represents a null position and, in the illustration of FIGURE 3, this radius lies directly beneath the arrow 67. The hypothetical acceleration trace 65 shown in FIGURE 3 clearly indicates that maximum longitudinal acceleration is proportional to the angle $\phi$ but that the lateral or orthogonal acceleration at that point was only proportional to the value $x$. Similarly, the point of maximum lateral acceleration occurred at a time of longitudinal acceleration of $\theta$ while the magnitude of the lateral acceleration was proportional to $y$.

The completed tracings can be read by a variety of means such as a microscope with a reader attachment. The lateral and longitudinal acceleration null points corresponding to the initial position of the stylus may be indexed on the reader attachment and the operator may then traverse to any point along the tracing by operation or orthogonally related adjustments on the microscope, one representing longitudinal acceleration, the other representing lateral or orthogonal acceleration. The reader attachment may have a built-in compensation for the deviation of the movement of the stylus from radial since the movement of the stylus is actually arcuate.

It will also be obvious to those skilled in the art that many modifications may be made in the apparatus of the present invention without departing from the spirit and scope thereof.

I claim:
1. A data storage accelerometer comprising: a shaft rotatable through an angular displacement corresponding to acceleration along the axis of said shaft; a linear-to-rotary transducer connected to said shaft to rotate said shaft about its axis in response to acceleration along said axis; a recording surface secured to said shaft for rotation therewith; an acceleration responsive means responsive to acceleration orthogonal to said shaft axis for displacement, perpendicular to said shaft axis, corresponding to said orthogonal acceleration; a recording head secured to said acceleration responsive means for recording a trace on said recording surface corresponding to the combined acceleration of said accelerometer along the axis of said shaft and orthogonal to the axis of said shaft.

2. The combination set forth in claim 1 wherein said recording head is a stylus in contact with said recording surface and wherein said recording surface is sensitive to said stylus contact for leading an optically visible trace.

3. The combination set forth in claim 1 wherein said acceleration responsive means is a pendulous mass.

4. The combination set forth in claim 1 wherein said recording surface comprises a circular disc and wherein said recording head is a stylus in contact with said disc having a null position substantially bisecting a radius of said disc.

References Cited
UNITED STATES PATENTS

| | | | |
|---|---|---|---|
| 2,698,215 | 12/1954 | Peck | 346—7 |
| 2,868,611 | 1/1959 | Carleton | 346—7 |
| 3,331,078 | 7/1967 | Howland | 346—7 |

RICHARD B. WILKINSON, *Primary Examiner.*

J. W. HARTARY, *Assistant Examiner.*

U.S. Cl. X.R.

73—489; 346—124